United States Patent [19]

Carolla et al.

[11] Patent Number: 4,854,362

[45] Date of Patent: Aug. 8, 1989

[54] PNEUMATIC TIRE

[75] Inventors: Russell A. Carolla; Nathan A. Gammon, both of Akron, Ohio

[73] Assignee: The Goodyear Tire & Rubber Company, Akron, Ohio

[21] Appl. No.: 197,524

[22] Filed: May 23, 1988

[51] Int. Cl.⁴ .............................................. B60C 9/04
[52] U.S. Cl. .................................... 152/554; 152/555
[58] Field of Search ............... 152/554, 555, 559, 542, 152/528

[56] References Cited

U.S. PATENT DOCUMENTS

| | | | |
|---|---|---|---|
| 4,129,162 | 12/1978 | DeWitt | 152/554 X |
| 4,166,491 | 9/1979 | Mezzanotte | 152/354 R |
| 4,185,675 | 1/1980 | Greiner et al. | 152/555 X |
| 4,287,929 | 9/0981 | Huinink | 152/354 R |
| 4,688,617 | 8/1987 | Hopkins et al. | 152/554 |
| 4,722,381 | 2/1988 | Hopkins et al. | 152/528 X |

FOREIGN PATENT DOCUMENTS 61-169303  7/1986  Japan ................................ 152/542

Primary Examiner—Michael W. Ball
Assistant Examiner—Ramon R. Hoch
Attorney, Agent, or Firm—R. W. Brown; R. D. Emerson

[57] ABSTRACT

A pneumatic tire has first and second carcass plies. The first carcass ply has outer portions that are folded around axially spaced annular tensile members (bead cores) and terminate under a belt structure. A pair of shoulder plies are disposed in the upper sidewalls of the tire between the central portion of the second carcass ply and the lateral edge portions of the first carcass ply. A pair of lower sidewall plies are disposed in the lower sidewalls, and are folded around their respective annular tensile members, terminating radially inwardly of the axially widest part of the tire.

6 Claims, 5 Drawing Sheets 4,854,362

PNEUMATIC TIRE

BACKGROUND OF THE INVENTION

1. Field of Invention

The present invention relates generally to pneumatic tires and more specifically to high performance pneumatic tires, and even more specifically to race tires.

2. Description of the Prior Art

In the prior art, pneumatic tires have carcass plies that are folded around the annular tensile members with the lateral edge portions of the carcass plies located radially inwardly of the axially widest part of the tire. Heretofore it was also known to construct tires so that the lateral edge portions of at least one carcass ply extended to a point under the belts, as is exemplified by the tire disclosed in U.S. Pat. No. 4,668,617. These tires could feature one or more carcass plies. Under some conditions, the prior art tires failed to generate the desired level of cornering forces.

SUMMARY OF THE INVENTION

In a tire according to the present invention, an envelope construction similar to that disclosed in U.S. Pat. No. 4,688,617 is used with the addition of reinforcing plies in the sidewall of the tire. These reinforcing plies provide a novel structural combination having capabilities improved over those found in the prior art. The addition of the reinforcing plies in the sidewall of the tire increases the cornering forces generated by the tire. Other performance improvements such as an improved ride were also obtained.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENTS

Figure 1:
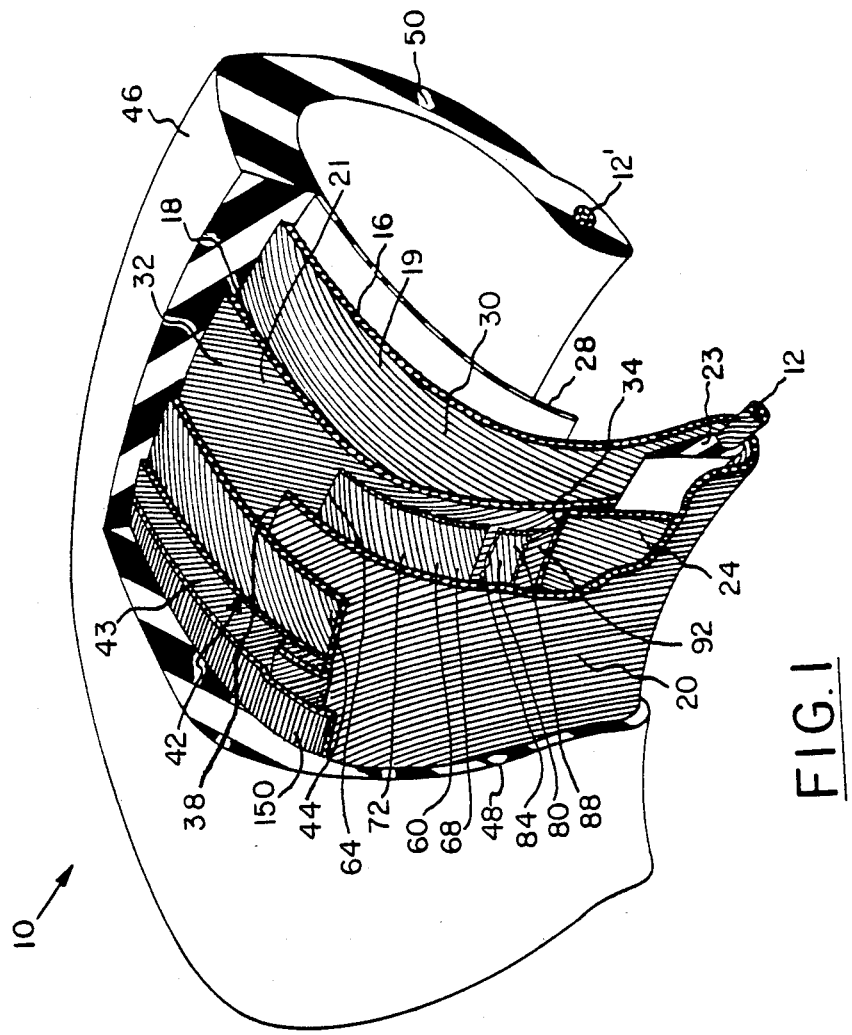
FIG. 1 is a perspective view of a section of a tire, partially broken away to reveal the internal structure of the tire, and depicts one aspect of the invention.

The invention also may be better understood in the context of the following definitions, which are applicable both to the specification and to the appended claims:

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Equatorial plane (EP)" means the plane perpendicular to the tire's axis of rotation and passing through the center of its tread.

"Cord" means one of the reinforcement strands of which the plies in the tire are comprised.

"Cord angle", for a cord that crosses the equatorial plane, means the acute angle, left or right in a plan view of the tire, formed by a cord with respect to the equatorial plane. If the cord does not cross the equatorial plane, the "cord angle" means the acute angle formed by the cord with a circumferential line in the ply. The circumferential line passes through the point at which the "cord angle" is to be measured and is contained in a plane parallel with the equatorial plane. The "left" or "right" orientation of a cord not passing through the equatorial plane is determined by what the orientation would be were the cord to extend across such plane while remaining in the tire. The "cord angle" is measured in a curved but uninflated tire.

"Ply", unless otherwise specified, means a continuous layer of rubber-coated parallel cords.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Belt structure" means at least two layers of plies of parallel cords, woven or unwoven, underlying the tread, unanchored to the bead, and having both left and right cord angles in the range from 17 degrees to 27 degrees with respect to the equatorial plane of the tire.

"Sidewall" means that portion of a tire between the tread and the bead.

"Tread" means that portion of a tire that comes into contact with the road when the tire is normally inflated and under normal load.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Section Width Line (SWL)" means a line parallel in the cross-section of the tire to its axis of rotation and which is located at the tire's point of maximum axial width, i.e., at the location at which the tire's section width is measured.

"Section height" means the radial distance from the nominal rim diameter to the outer diameter of the tire at its equatorial plane.

"Innerliner" means the layer or layers of elastomer or other material that form the inside surface of a tubeless tire and that contain the inflating fluid within the tire.

"Axial" and "axially" are used herein to refer to lines or directions that are parallel to the axis of rotation of the tire. "Radial" and "radially" are used to mean directions radially toward or away from the axis of rotation of the tire. "Inner" means toward the inside of the tire and "outer" means toward the exterior.

Figure 2:
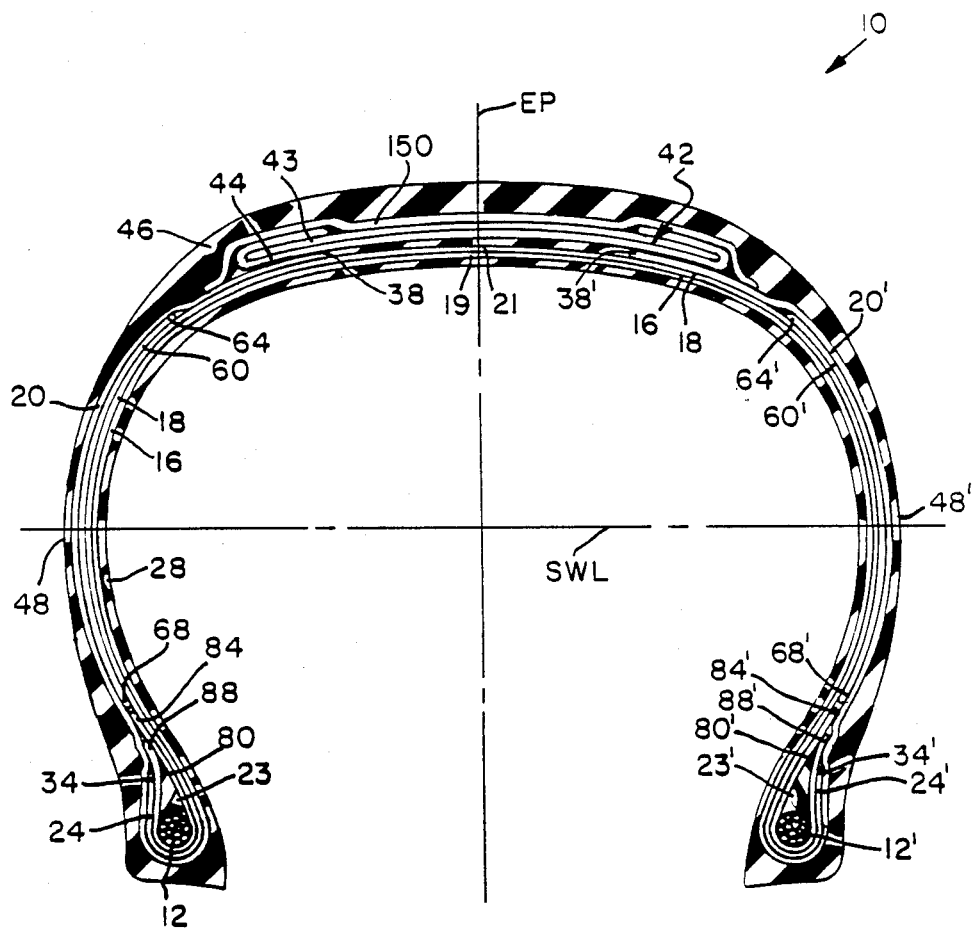
FIG. 2 is a radial cross-sectional view of the tire illustrated in FIG. 1.

In the drawings, the same numerals are used for the same components or items in the several views. With particular reference now to FIGS. 1 and 2, there is illustrated a pneumatic tire 10 designed for automobile racing and constructed in accordance with the present invention.

The tire 10 has a pair of axially spaced apart annular tensile members 12, 12'. The annular tensile members are shown as wire filaments arranged in a circular cross-section but this is not believed to be essential to the invention and the annular tensile members could have hexagonal or other well known cross-sectional shapes or be manufactured of cables or other materials.

Two circumferentially extending radially superposed first and second carcass plies 16, 18 extend between the annular tensile members 12, 12'. An innerliner 28, is disposed radially inwardly of the first and second carcass plies. Each of the first and second carcass plies has a central portion 19, 21 disposed between the two annular tensile members. Lateral edge portions 20, 20', 24 and 24' are turned up or about their respective annular tensile members. The lateral edge portions 20, 20', 24, 24' of each of the first and second carcass plies are folded axially and radially outwardly around their respective annular tensile members. An apex strip 23 may be disposed between each annular tensile member and the central portion 21 and lateral edge portions 24, 24' of the second carcass ply 18.

Any material commonly used in the art for carcass ply reinforcement can be used for the cords of the first and second carcass plies 16, 18, but nylon is the preferred material because it withstands the high temperatures associated with high speeds. The cords 30, 32 of the first and second carcass plies 16, 18 are oriented at angles between 65 degrees and 90 degrees with respect to the equatorial plane EP of the tire. Preferably, the cords 30 in the first poly 16 are oriented at 72 degrees right and the cords 32 in the second ply 18 are oriented at 72 degrees left, that is, the cord orientation of the two plies are "opposite" to one another.

The lateral edges 34, 34' of the lateral edge portions 24, 24' of the second carcass ply are disposed radially inwardly of the section width line SWL (FIG. 2). The lateral edges 38, 38' of the first carcass ply are axially spaced apart from one another and interposed between the central portion 21 of the second carcass ply 18 and a circumferentially extending belt structure 42. Preferably, the second carcass ply 18 has a narrower unfolded width, and therefore radially lower lateral edges, than the first carcass ply 16. However, a tire according to the invention could have a second carcass ply with its lateral edges located beneath the belt structure of the tire, while the first carcass ply could have lateral edges located radially inwardly of the second width line SWL.

The belt structure 42 illustrated in the drawing comprises a plurality of belt plies 43, 44 of the type well known in the art. The cords of the belt plies may be selected from any of the high strength belt reinforcing materials which now include steel, aromatic polyamides, and glass. Racing tires constructed according to the invention have utilizes belt ply cords of fiberglass filament because of its relatively light weight and high temperature characteristics. An overlay 150 is disposed radially outwardly of the belt plies 42, 43. The cords in the overlay are preferably made of nylon and have a cord angle of less than 30 degrees. While the illustrated belt structure has folded belt plies 43, 44 with an overlay, other belt structures may be used such as cut edge, split, no overlay or edge-reinforced constructions.

An elastomeric tread portion 46 extends circumferentially about the tire, radially outwardly of the belt structure 42. This tread portion may be formed with a pattern of grooves and extending portions in order to achieve certain performance parameters.

The sidewalls of the tire 10 include outer elastomeric portions 48, 48' that extend radially inwardly from the tread 46 to the annular tensile member portions of the tire.

A pair of shoulder plies 60, 60' reinforce the upper sidewall area of the tire. One lateral edge 64, 64' of each shoulder ply 60, 60' is located between the equatorial plane of the tire and the lateral edges of the belt plies 43, 44. A second edge 68, 68' of each shoulder ply 60, 60' is located no further from the section width line SWL than 30% of the section height of the tire. Each shoulder ply extends circumferentially about the tire and is located between the central portion of the second carcass ply 18 and the lateral edge portion of the first carcass ply 20, 20'. Preferably, the shoulder plies 60, 60' have been reinforced with cords made of nylon because nylon performs well in the high temperatures associated with high speeds. A majority of each shoulder ply lies between the central portion 21 of the second carcass ply 18 and the lateral edge portion 20, 20' of the first carcass ply 16. As shown in FIG. 1, the cords 72 of the shoulder plies 60, 60' are oriented such that the cords of the lateral edge portion 20, 20' of the first carcass ply 16' and the cords of the central portion 21 of the second carcass ply 18 are opposite to those of the shoulder plies 60, 60'. The angle between the cords 72 of the shoulder plies 60, 60' and the cords of the respective lateral edge portions 20, 20' of the first carcass ply 16 and the cords of the central portion 21 of the second carcass ply 18 is at least 5 degrees. This orientation of the cords produces a reinforced elastomeric matrix or composite which strengthens the sidewall area of the tire and helps achieve higher cornering force and improved steering response in vehicles for which the tire is appropriate.

Although the cords 72 of the shoulder plies 60, 60' are preferably opposite to the cords of the central portion 21 of the second carcass ply 18, they may be oriented in the same direction to achieve certain performance objectives. Tires having cords in plies 72, 60 and 60' that are all directed left or right would tend to generate less cornering force but would have a smoother ride than tires in which such cords are opposite in ply 72 as compared to plies 60, 60'.

A pair of lower sidewall plies 80, 80' are located in the lower sidewall of the tire 10. The first edge 84, 84' of the lower sidewall plies 80, 80' is located radially inwardly of the section width line SWL. Preferably, the first edge 84, 84' is adjacent the radially innermost edge 68, 68' of one of the shoulder plies 60, 60' and extends radially inwardly to its respective annular tensile member, being folded axially and radially outwardly around the annular tensile member. Each lower sidewall ply 80, 80' is folded axially and radially outwardly abouts its respective annular tensile member 12, 12'. The second edge 88, 88' of the lower sidewall plies 80, 80' is located between the section width line SWL and the lateral edge 34, 34' of the lateral edge portions 24, 24' of the second carcass ply. In the preferred form of the invention, the cords of the lower sidewall plies are manufactured from an aromatic polyamide (aramid). This material was chosen because of its high strength per unit weight. Because the material is strong, a smaller apex strip 23 can be used and the tire is still able to retain the desired cornering-force characteristics. The smaller apex strip 23, along with the lower sidewall plies 80, 80', contributes to improved ride by providing a more uniform transition from the flexible sidewalls 48, 48' to the stiff annular tensile members 12, 12'.

Figure 3:
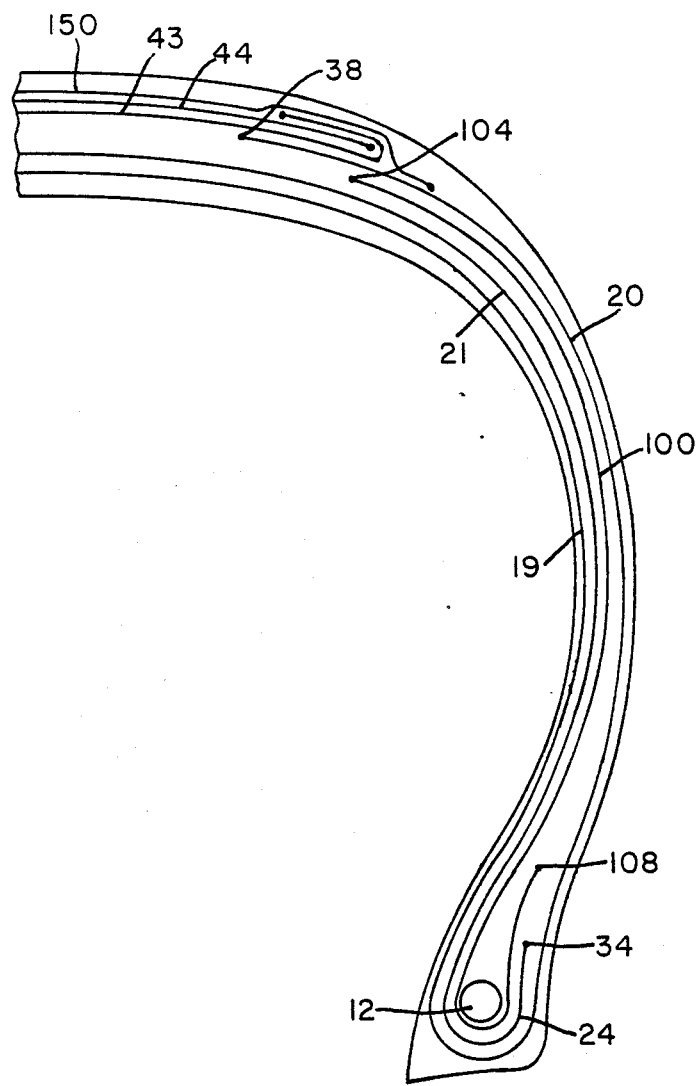
FIG. 3 is a schematic, cross-sectional view of one half of a tire illustrating a second aspect of the invention.

Another aspect of the invention is shown in FIG. 3. A pair of shoulder plies 100, 100' has the same effect and general construction as the plies 60, 60' and the plies 80, 80'. The shoulder plies 100, 100' are preferably made of nylon due to nylon's performance characteristics in high temperature, high strain environments. The shoulder plies 100, 100' may be easier to manufacture and apply during tire construction than the plies 60, 60' when used together with the plies 80, 80'. The first edge 104, 104' of each shoulder ply 100, 100' corresponds to the first edge 64, 64' of the reinforcing ply 60, 60'. The second edge 108, 108' of the shoulder ply 100, 100' corresponds to the second edge 88, 88' of the ply 80, 80'. By "corresponds" it is meant that the location of the edges are the same.

In some applications, more uniform tension in the bead area can be obtained by folding the shoulder plies 100, 100' radially and axially inwardly around the axial tensile members 12, 12'. The more uniform tension will improve the tire's steering response.

These cords are opposite in orientation to the cords in the lateral edge portion 20, 20' of the first carcass ply 16 and the cords in the central portion 21 of the second carcass ply 18.

Figure 4:
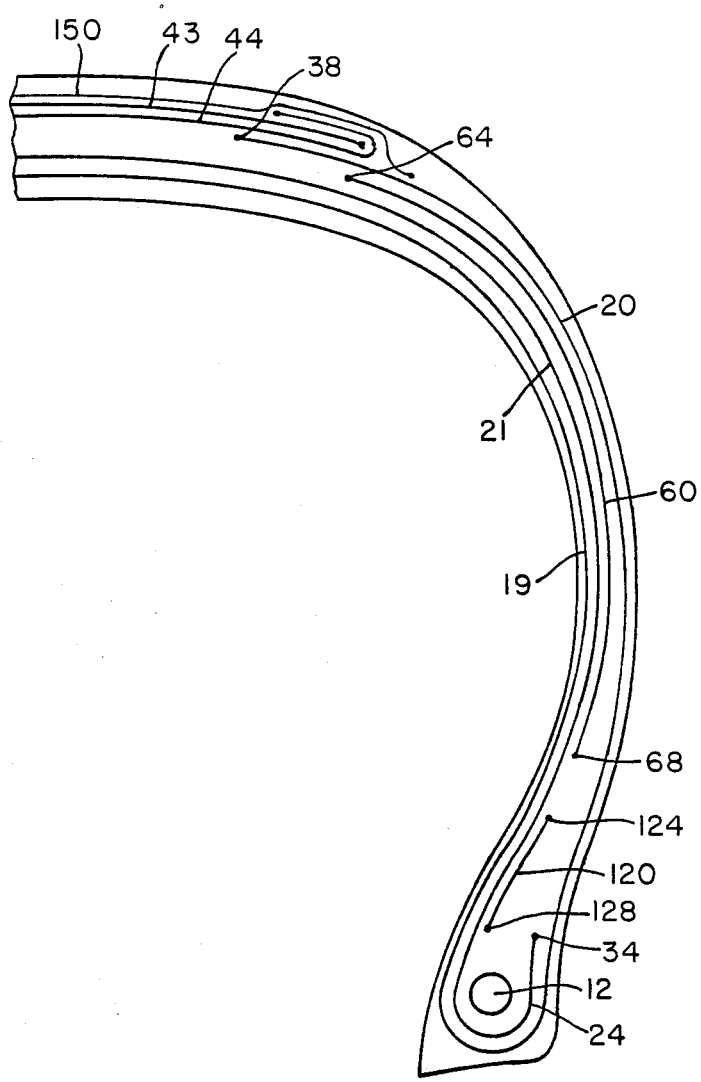
FIG. 4 is a schematic, cross-sectional view of one half of a tire illustrating a third aspect of the invention.
Figure 5:
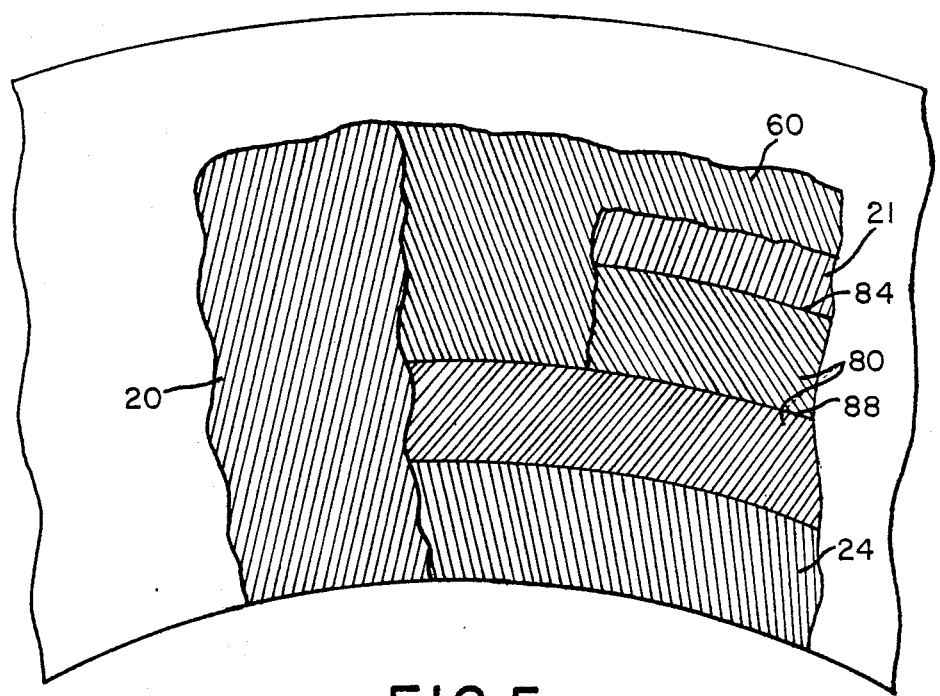
FIG. 5 is a schematic view of a tire, partially broken away to reveal the internal structure of the tire.
Figure 6:
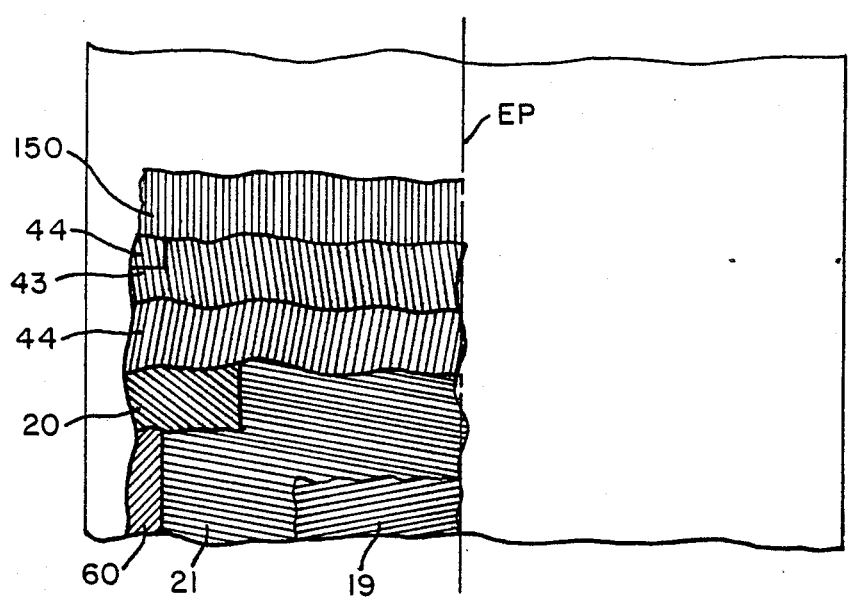
FIG. 6 is a schematic view of the tire, partially broken away to reveal the internal structure of the tire.

Another aspect of the invention is illustrated in FIG. 4. A pair of lower sidewall plies 120, 120' are shown. These lower sidewall plies 120, 120' are similar to the lower sidewall plies 80, 80' discussed previously, but differ in that they are not folded around the annular tensile members 12, 12'. The lower sidewall plies 120, 120' work in conjunction with the shoulder plies 60, 60' just as the lower sidewall plies 80, 80' in the embodiments shown in FIG. 2. The first edge 124, 124' of each lower sidewall ply 120, 120' corresponds to the first edge 84, 84' of the lower sidewall ply 80, 80'. Each lower sidewall ply 120, 120' extends from the radially innermost edge 68, 68' of one of the shoulder plies 60, 60'. By "corresponds" it is meant that the location of the edges and their function are the same. The second edge 128, 128' of the lower sidewall ply 120, 120' extends to a point radially outward of the annular tensile member 12, 12' and radially inward of the edge 34, 34' of the axially lateral edge portion 24, 24' of the second ply 18. The cords in the lower sidewall plies are preferably constructed of aromatic polyamide (aramid) because of its strength per weight ratio and stiffness. The cords of the lower sidewall plies 120, 120' are oriented so that the angle with respect to the equatorial plane EP is opposite to the cords 32 of the central portion of the second carcass ply 18 and the cords 30 of the lateral edge portion 20, 20' of the first ply 16.

Another aspect of the invention is the use of lower sidewall plies 80, 80' in a tire without utilizing shoulder plies 60, 60'. Although the lower sidewall plies 80, 80' work well in conjunction with the shoulder plies 60, 60', certain performance improvements are possible through the use of the lower sidewall plies 80, 80' alone.

Based on the foregoing description of the invention, what is claimed is:

1. A pneumatic tire for use on paved road surfaces, the pneumatic tire comprising:
    a pair of axially-spaced annular tensile members;
    first and second carcass plies extending between the annular tensile members, each of the first and second carcass plies having a central portion and lateral edge portions, the central portion of the second carcass ply being located outwardly of the central portion of the first carcass ply, and each lateral edge portion of the first and second carcass plies being folded axially and radially outwardly around one of the annular tensile members;
    a belt structure extending circumferentially about the first and second carcass plies; the lateral edges of the first carcass ply being interposed between the central portion of the second carcass ply and the belt structure; and
    a pair of shoulder plies, each shoulder ply being symmetrically positioned with respect to the other on axially opposed sides of the tire and at least the majority of each such shoulder ply being disposed axially and radially outwardly of the central portion of the second carcass ply and axially and radially inwardly of the lateral edge portions of the first carcass ply, the cords of each shoulder ply forming an angle of at least five degrees with respect to the cords in the adjacent central portion of the second carcass ply and also with respect to the cords in the adjacent lateral edge portion of the of the first carcass ply, each shoulder ply extending from a point located between the equatorial plane of the tire and the lateral edges of the belt structure to a point radially inward of the section width line.

2. A pneumatic tire as in claim 1 which further comprises a pair of lower sidewall plies, each lower sidewall ply being symmetrically positioned with respect to the other on axially opposed sides of the tire, each lower sidewall ply extending from the radially innermost edge of one of the shoulder plies to its respective annular tensile member, being folded axially and radially outwardly around the annular tensile member, the cords of each lower sidewall ply making an angle of at least five degrees with respect to both the reinforcing cords in the adjacent central portion of the second carcass ply and those in the adjacent lateral edge portions of the first carcass ply.

3. A pneumatic tire as in claim 2 wherein the cords in the lower sidewall plies are made of an aromatic polyamide, the cords of the first and second carcass plies and the shoulder plies are made of nylon, and the cords of the belt structure are of a material selected from the group consisting of steel, glass, and aromatic polyamide.

4. A pneumatic tire as in claim 1, which further comprises a pair of lower sidewall plies, each of the lower sidewall plies being symmetrically positioned with respect to the other on axially opposed sides of the tire, each lower sidewall ply extending from the radially innermost edge of one of the shoulder plies to a point adjacent the lateral edge of the second carcass ply and radially outwardly of one of the annular tensile members, the cords of each lower sidewall ply forming an angle of at least five degrees with respect to both the cords in the adjacent central portion of the second carcass ply and those in the adjacent lateral edge portion of the first carcass ply.

5. A pneumatic tire as in claim 4 wherein the cords in the lower sidewall plies are made of an aromatic polyamide, the cords in the first and second carcass plies and the shoulder plies are made of nylon, and the cords of the belt structure are of a material selected from the group consisting of steel, glass, and aromatic polyamide.

6. A pneumatic tire as in claim 1 wherein each shoulder ply extends from a point located between the equatorial plane of the tire and the lateral edge of the belt structure, is folded radially and axially outwardly around one of the annular tensile members, and extends radially to a point radially outward of the the adjacent lateral edge portion of the second carcass ply, the cords of each shoulder ply making an angle of at least five degrees with respect to the cords in the adjacent central portion of the second carcass ply and also with respect to the cords in the adjacent lateral edge portion of the first carcass ply.

* * * * *